G. S. BAIRD.
CENTRIFUGAL APPARATUS FOR EXTRACTING HONEY AND THE LIKE.
APPLICATION FILED MAY 27, 1918.
1,334,585.
Patented Mar. 23, 1920.
2 SHEETS—SHEET 1.
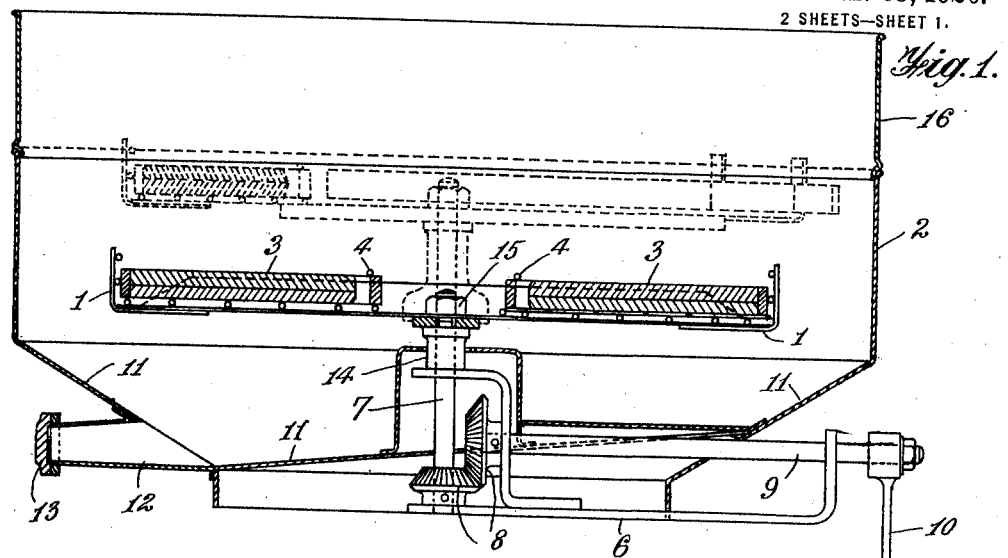
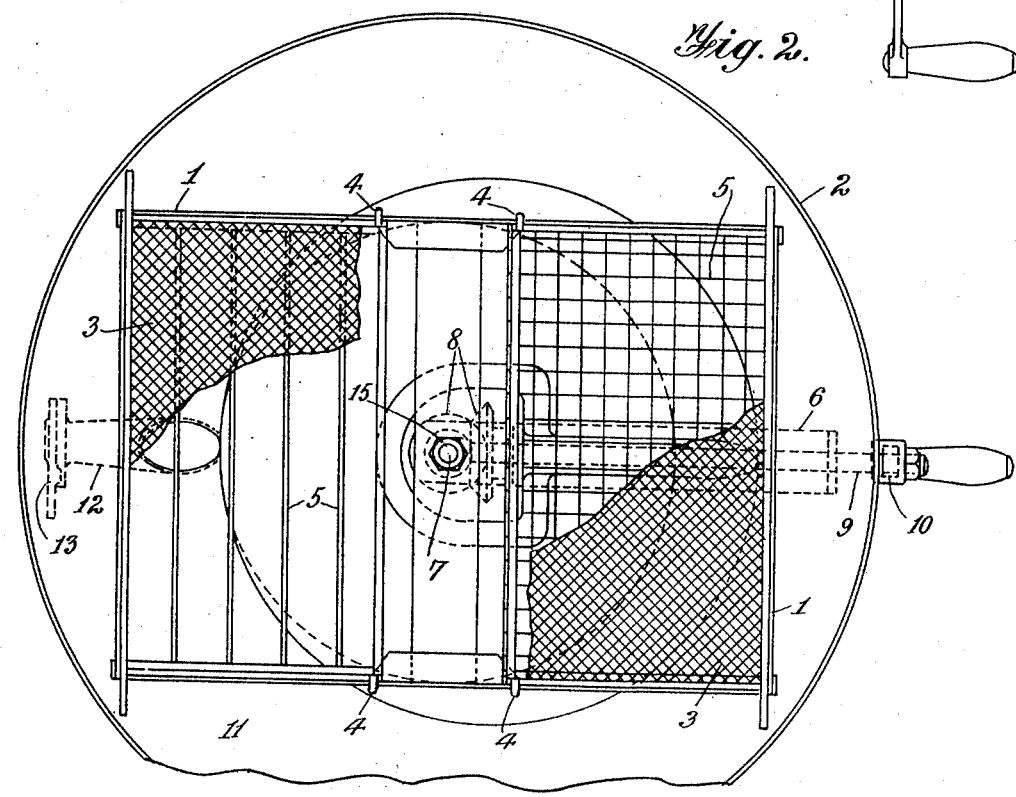

G. S. BAIRD.
CENTRIFUGAL APPARATUS FOR EXTRACTING HONEY AND THE LIKE.
APPLICATION FILED MAY 27, 1918.

1,334,585.

Patented Mar. 23, 1920.

UNITED STATES PATENT OFFICE.

GEORGE STEELE BAIRD, OF ERITH, ENGLAND.

CENTRIFUGAL APPARATUS FOR EXTRACTING HONEY AND THE LIKE.

1,334,585. Specification of Letters Patent. Patented Mar. 23, 1920.

Application filed May 27, 1918. Serial No. 236,903.

*To all whom it may concern:*

Be it known that I, GEORGE STEELE BAIRD, engineer, a subject of the King of Great Britain, residing at 1 Hurst road, Erith, in the county of Kent, England, have invented a new and useful Centrifugal Apparatus for Extracting Honey and the like; and I do hereby declare the following to be a full, clear, and exact description of the invention, such as will enable others skilled in the art to which it appertains to make and use the same.

This invention relates to centrifugal apparatus for extracting honey and the like from the comb, and it consists in the constructions, combinations, and arrangements, herein described, and claimed.

The primary object of my invention is to provide an apparatus to extract honey or like substance from both sides of the comb at one operation without damage to the cells.

Other objects and advantages will appear in the following specification reference being had to the accompanying drawings in which Figure 1 is a sectional elevation of the apparatus showing two frames in position with an extra lift on the outer casing. Fig. 2 is a plan showing a frame suitable for taking two standard or two shallow combs, and Fig. 3 a plan taking three shallow combs.

Figure 4:
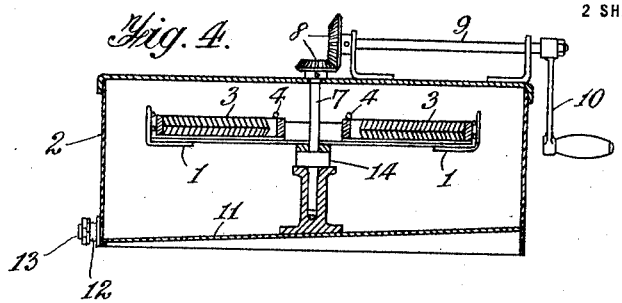

Fig. 4 is a sectional elevation showing a modified arrangement with gearing fixed on the top of the extractor above the combs.

In carrying out my invention I provide a flat frame 1 within a cylindrical casing 2 upon which disk or table the combs 3 are laid with the mid rib of the comb in a horizontal position. 4—4 are adjustable stops provided on the frame 1 to hold the comb 3 in position, and 5 is a wire mat (or mats) placed on the frame 1 to support the comb.

A bracket 6 supports a central spindle 7 on which the frame 1 is placed with gearing 8, shaft 9, crank and handle 10, by which the frames are made to revolve and thereby produce the centrifugal force which ejects or extracts the honey from both sides of the comb and at the one operation.

The cylindrical casing 2 is formed with a sloping base 11 having an outlet 12 fitted with a valve 13 or the like for draining the honey.

14 is a collar which is fastened to the spindle 7 and has projections on its upper face which engage in slots in the frame 1 and form a key by which the motion of the spindle 7 is communicated to the frame. A nut 15 is used to fasten the frame in position on the spindle 7.

An additional lift 16 may be fitted when required and two or more frames 1 may be used at the same time as shown in dotted lines in Fig. 1.

Figure 3:
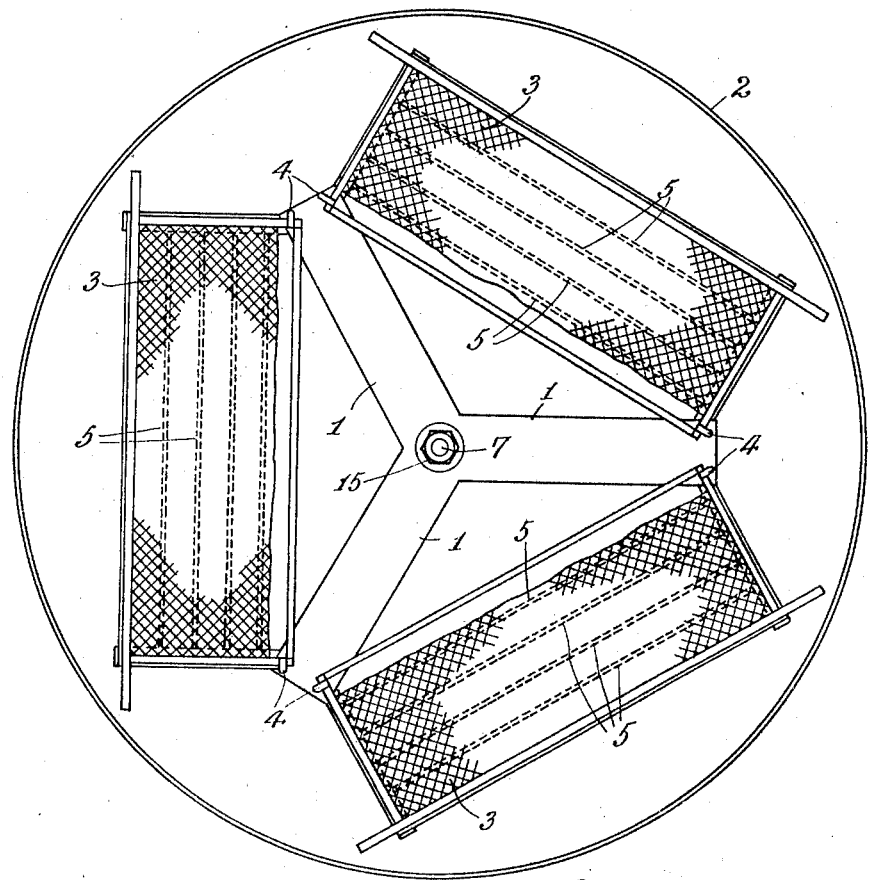

In the arrangement shown in Fig. 3 the frame 1 is shown as adapted for the support of three shallow combs, said frame 1 comprising three arms radiating from a common center. The geared central spindle passes through said center and is secured to the frame and revolves same when operated similarly to the manner described with reference to Fig. 1.

In Fig. 4 the driving mechanism 8, 9, 10, is shown as arranged above the apparatus and is connected to the upper end of the central spindle 7.

What I do claim as my invention, and desire to secure by Letters Patent, is:—

In a centrifugal apparatus for extracting honey, the combination of a receptacle, a horizontal frame rotatably mounted within the receptacle, said frame including a plurality of radial arms, a pair of extensions on the end of each arm, the adjacent extensions on adjacent arms being disposed parallel to each other, comb carrying mats supported on said adjacent extensions, means for holding the comb on said mats during rotation of the frame, and means for rotating the frame.

In testimony whereof I have signed my name to this specification in the presence of two subscribing witnesses.

GEORGE STEELE BAIRD.

Witnesses:
ERNEST TAYLOR,
WM. K. WEST.